Dec. 8, 1964  J. W. DREW  3,160,192
PNEUMATIC TIRE
Filed Jan. 13, 1961

INVENTOR.
JAMES W. DREW
BY
J. B. Holden
ATTORNEY

United States Patent Office 3,160,192
Patented Dec. 8, 1964

3,160,192
PNEUMATIC TIRE
James W. Drew, Cuyahoga Falls, Ohio, assignor to The Goodyear Tire & Rubber Company, Akron, Ohio, a corporation of Ohio
Filed Jan. 13, 1961, Ser. No. 82,438
8 Claims. (Cl. 152—355)

This invention relates to pneumatic tires and, more particularly, to the carcass of pneumatic tires made of nylon or other textile material having similar modulus and growth characteristics to that of nylon.

Since the advent of nylon tires many attempts have been made to solve the problem of "parking set" or "flat spotting," which occurs after nylon tires have been driven for some distance and parked for a sufficient period of time to permit the tire to cool down to ambient temperatures. Thereafter, for the first five to fifteen miles that the car is driven a very noticeable thumping occurs due to the so-called "parking set" or "flat spotting" of the nylon carcass.

Many theories have been developed to explain why the phenomenon of "flat spotting" occurs in nylon carcasses, for example, it has been theorized that after a nylon carcass tire has been driven sufficiently long enough to heat the tire, and it is then parked, the shrinkage characteristics of the nylon cord are sufficiently great to permit the cords in the road contact area to shrink to a greater extent than the cords in the remainder of the tire, thereby producing a flat spot in which the radial dimension in that portion of the tire in contact with the road during the parking period is less than the remainder of the tire.

It has now been discovered that "parking set" or "flat spotting" of nylon carcasses are related to the modulus and growth characteristics of nylon cord rather than to the shrinkage characteristics thereof. This invention permits the manufacture of tire carcasses which "flat spot" to an extent which is imperceptible. Among the objects of this invention are to provide a tire carcass made of nylon in which the "flat spotting" tendency is reduced to an acceptable level and which has less than one-half as much "flat spotting" as a nylon carcass, and at the same time to provide an increase in bruise resistance over rayon tires, better bead durability than nylon tires, carcass durability at least equal to rayon tires and thump and roughness acceptability better than rayon tires.

Figure 1:
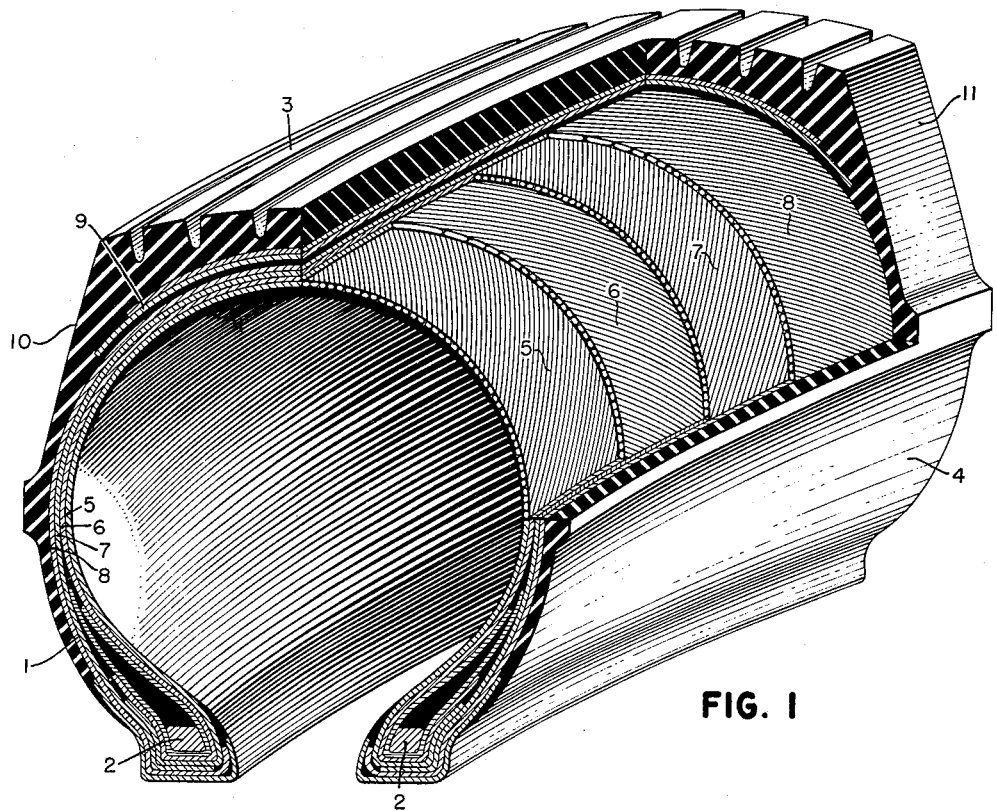
Figure 2:
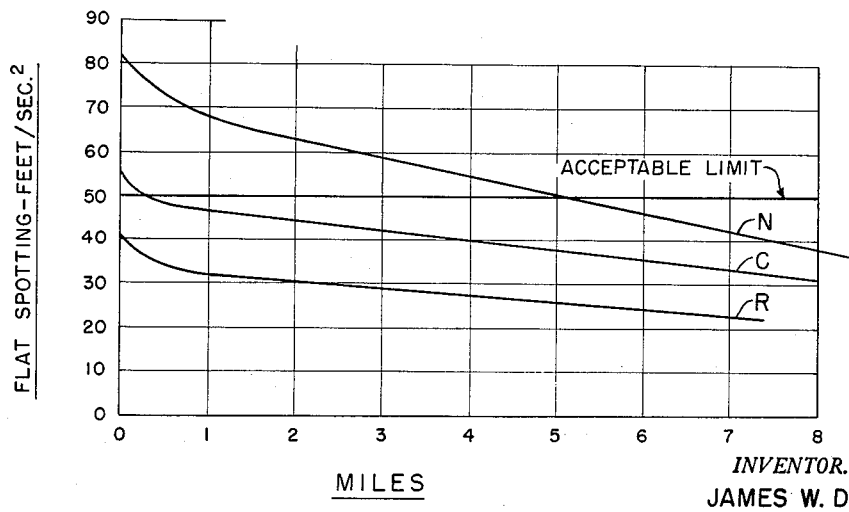

These and other objects of this invention will be apparent from the following detailed description when considered in connection with the accompanying drawings, in which FIG. 1 is an isometric view of a tire carcass with parts broken away showing a tire construction made according to this invention;

FIG. 2 is a graph comparing the "flat spotting" characteristics, respectively, of nylon tires, rayon tires, and tires made according to this invention at various mileages subsequent to parking.

With reference to FIG. 1 of the drawings, there is shown a pneumatic tire comprising a carcass 1, inextensible beads 2, tread 3 of rubber composition, and sidewall portions 4 of a rubber composition. Carcass 1 is formed of an even number of fabric plies 5, 6, 7, and 8 corresponding to plies conventionally referred to as the first, second, third and fourth plies, respectively. A breaker assembly 9 is positioned in the crown area of the tire between the fabric plies and the tread 3 and may comprise two plies of cord fabric which are cross-angled relatively to each other, and extending from shoulder 10 to shoulder 11 of the tire.

In accordance with this invention, the first and second plies 5 and 6 are made of rubber coated nylon cord fabric which is cut on a bias so that the cords in each of the plies 5 and 6 extend at an angle of from 25 to 60° in the crown area of the tire, measured between the cord and the center line of the tire, and with the cords in each of the plies extending in opposite directions. The plies 7 and 8 are likewise made of cord fabric suitably coated with rubber and extending from bead to bead of the tire with the cords extending at an angle of from 30 to 60° in the crown area of the tire and with the angle of the cords in each of the plies 7 and 8 extending in opposite directions. In the preferred construction the cords of the plies 6 and 7 extend at opposite angles. Preferably, the plies 7 and 8 are made of a material having high cord modulus and low growth characteristics, such as rayon textile material or other textile material, such as Dacron, polypropylene, and the like. In particular, it has been found that the plies 7 and 8 should be made of a textile material such that the cord modulus at 275° F. is greater than 25 grams per denier while the cord growth at 275° F. is less than 10%. These characteristics are measured according to the "Methods of Testing and Tolerances for Tire Cords Made From Synthetic Fibers," published by the American Society for Testing Materials, A.S.T.M. designation D–885–59T, revised in 1959.

The cord modulus is the ratio of the change in stress to the change in strain in the initial straight line portion of a stress-strain curve and is characterized as the force required to stretch a specimen 100%. However, due to the fact that tire cords will not stretch to 100% without breaking, the A.S.T.M. standards provide that the modulus be extrapolated by multiplying the force required to stretch the cord 10% by a factor of 10. Cord growth is a measure of the elongation of the cord under one gram per denier load.

Referring to FIG. 2 of the drawing, comparative data of "parking set" is shown for tires made according to this invention, curve C; tires made entirely of nylon, curve N; and tires made entirely of rayon, curve R. The horizontal coordinate of the graph is calibrated in miles, and the vertical coordinate is calibrated in feet per second squared. Each of the tires were in turn mounted on a wheel of a car and driven by means of a smooth dynamometer wheel. An accelerometer, such as type No. 761–P–1, made by General Radio Company, was attached to the axle which senses the vibration of vertical acceleration of the axle due to "flat spotting." The voltage output of the accelerometer is a measure of the vertical acceleration of the axle caused by "flat spotting" of the tire and is plotted on the graphed FIG. 2, respectively, for each of the tires. It is seen that the curve N shows that a conventional nylon carcass has a relatively large amount of initial "flat spotting" or "parking set" which gradually decreases but is perceptible within the car until the car has been driven five or six miles. The acceptable limit is that threshold at which noise or vibration caused by "flat spotting of the tire" is perceptible by an occupant of the car. Curve R is a measure of "parking set" of a rayon tire carcass in which the initial "flat spotting" is approximately 50% of nylon tires and decreases as the car is driven. The initial "parking set" of a rayon carcass tire is not perceptible and is well below the acceptable limit. The curve C is a measure of "flat spotting" of a tire made according to this invention and it is seen that the initial "flat spotting" of the curve C is slightly above the perceptible limit initially, but quickly passes below the acceptable limit so that after approximately one-quarter mile the vibration or thump due to "parking set" is not perceptible. Tires made according to this invention have the advantages of conventional nylon tires with regard to bruise resistance in that they are three times more resistant to bruise failure than rayon tire carcasses, and otherwise favorably compare to nylon tires with regard to durability. On the other hand, tires made according to this invention do not exhibit perceptively the "flat spotting" or "parking set" characteristics which have handicapped nylon tires in the past.

While certain representative embodiments and details have been shown for the purpose of illustrating the invention, it will be apparent to those skilled in this art that various changes and modifications may be made therein without departing from the spirit or scope of the invention.

What is claimed is:

1. A generally toroidal pneumatic tire comprising an open bellied hollow annular carcass terminating in spaced apart bead portions, a bead ring in each bead portion, said carcass comprising a plurality of plies of bias laid textile cord material embedded in rubber extending from bead to bead and turned around the bead rings, the radially innermost cord plies being made of synthetic linear polymeric material shrinkable to a limited extent on cooling and oppositely directed on a bias relative to the centerline of the tire, the radially outermost cord plies being made of a textile having a cord modulus at 275° F. greater than 25 grams per denier and cord growth at 275° F. of less than 10%, said radially outermost plies being oppositely directed on a bias.

2. A tire as claimed in claim 1 in which said radially outermost plies are made of rayon and all of the plies extend at an angle of 25° to 60° relative to the centerline of the tire.

3. A tire as claimed in claim 1 composed of at least four plies in which each of the plies extends at an angle to an adjacent ply.

4. A tire as claimed in claim 1 in which said synthetic linear polymeric material comprises one-half of the total number of plies.

5. A generally toroidal pneumatic tire comprising an open bellied hollow annular carcass terminating in spaced apart bead portions, a bead ring in each bead portion, said carcass comprising a plurality of plies of bias laid textile cord material embedded in rubber extending from bead to bead and turned around the bead rings, one-half of the total number of plies being made of nylon and the other half of said total number of plies being made of a textile having a cord modulus at 275° F. greater than 25 grams per denier, and cord growth at 275° F. of less than 10 percent, said nylon cords being located radially inward of the said other one-half of the total number of plies.

6. A pneumatic tire comprising tread and sidewall portions terminating in annular beads, and a carcass including four bead-to-bead strain-resisting cord fabric plies, the two innermost plies being nylon cord fabric and the two outermost plies being rayon cord fabric, and successive plies of the carcass having the cords of the same crossing at opposite angles to the median plane of the tire.

7. A pneumatic tire having tread and sidewall portions terminating in annular beads, and a carcass comprising a plurality of bead-to-bead strain-resisting plies of nylon cord fabric and rayon cord fabric, the number of plies of rayon cord fabric and nylon cord fabric being equal, the nylon cord fabric located radially inwardly and the rayon cord fabric located radially outwardly, and successive plies of the carcass having the cords of the same crossing at opposite angles to the median plane of the tire.

8. A pneumatic tire comprising tread and sidewall portions terminating in annular beads, and a carcass of strain-resisting fabric plies including a series of an even number of at least two bead-to-bead plies of nylon cord fabric and a series of an even number of at least two bead-to-bead plies of rayon cord fabric, at least the two innermost fabric plies of the carcass being nylon cord fabric, and the successive plies of each cord fabric type of the carcass having the cords of the same crossing at opposite angles to the median plane of the tire.

References Cited in the file of this patent

UNITED STATES PATENTS

| | | |
|---|---|---|
| 2,198,586 | McKone | Apr. 23, 1940 |
| 2,782,830 | Wallace | Feb. 26, 1957 |
| 2,844,181 | Riggs et al. | July 22, 1958 |

FOREIGN PATENTS

| | | |
|---|---|---|
| 1,207,650 | France | Sept. 7, 1959 |